United States Patent
Upadhyay et al.

(10) Patent No.: US 9,732,646 B2
(45) Date of Patent: Aug. 15, 2017

(54) SYSTEMS AND METHODS FOR OPPORTUNISTIC DIESEL PARTICULATE FILTER REGENERATION

(71) Applicant: Ford Global Technologies, LLC, Dearborn, MI (US)

(72) Inventors: Devesh Upadhyay, Canton, MI (US); Michael Hopka, Milford, MI (US); Thomas Alan Brewbaker, Plymouth, MI (US); Cory Scott Hendrickson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 14/594,987

(22) Filed: Jan. 12, 2015

(65) Prior Publication Data
US 2016/0201533 A1  Jul. 14, 2016

(51) Int. Cl.
F01N 3/023 (2006.01)
F01N 9/00 (2006.01)

(52) U.S. Cl.
CPC ........... *F01N 3/0232* (2013.01); *F01N 9/002* (2013.01); *F01N 2900/10* (2013.01); *F01N 2900/102* (2013.01); *F01N 2900/1606* (2013.01); *Y02T 10/47* (2013.01)

(58) Field of Classification Search
CPC .... F01N 3/0232; F01N 9/002; F01N 2900/10; F01N 2900/102; F01N 2900/1606; Y02T 10/47
USPC ............................. 701/102; 60/274, 295, 297
See application file for complete search history.

(56) References Cited

U.S. PATENT DOCUMENTS

| | | | |
|---|---|---|---|
| 6,666,020 B2 | 12/2003 | Tonetti et al. | |
| 6,725,653 B2* | 4/2004 | Brown | C10L 1/328 123/1 A |
| 8,015,805 B2* | 9/2011 | Pfaeffle | F01N 3/023 60/274 |
| 8,392,091 B2* | 3/2013 | Hebbale | F01N 9/00 60/274 |
| 8,424,294 B2* | 4/2013 | Schumacher | F01N 9/002 60/274 |
| 8,539,759 B2 | 9/2013 | Ament et al. | |
| 8,572,951 B2* | 11/2013 | Gallagher | B61C 5/04 123/676 |
| 2003/0084658 A1* | 5/2003 | Brown | C10L 1/328 60/274 |
| 2003/0196430 A1* | 10/2003 | Brown | C10L 1/328 60/297 |

(Continued)

FOREIGN PATENT DOCUMENTS

| | | |
|---|---|---|
| WO | 2011087431 A1 | 7/2011 |
| WO | 2014124864 A1 | 8/2014 |

*Primary Examiner* — Stephen K Cronin
*Assistant Examiner* — Susan Scharpf
(74) *Attorney, Agent, or Firm* — Julia Voutyras; McCoy Russell LLP

(57) ABSTRACT

Methods and systems are provided for opportunistic regeneration of a diesel particulate filter based on cloud based traffic information and navigation information. In one example, a method may include determining initiation of regeneration, termination of regeneration and a degree of regeneration based on information from a lead vehicular network and navigation information in order to reduce a regeneration fuel penalty.

20 Claims, 6 Drawing Sheets

(56) References Cited

U.S. PATENT DOCUMENTS

| | | | |
|---|---|---|---|
| 2004/0103788 A1* | 6/2004 | Streichsbier | B01D 41/04 95/279 |
| 2010/0043404 A1* | 2/2010 | Hebbale | F01N 9/00 60/286 |
| 2011/0283682 A1* | 11/2011 | Gallagher | B61C 5/04 60/274 |
| 2012/0006008 A1* | 1/2012 | Ardanese | F01N 3/023 60/277 |
| 2012/0216509 A1* | 8/2012 | Sujan | F02D 41/021 60/274 |
| 2015/0013312 A1* | 1/2015 | Gallagher | F02M 25/0818 60/274 |
| 2015/0285112 A1* | 10/2015 | Mathiasson | B01D 46/0019 60/311 |

* cited by examiner

| Traffic Preview | Description | Regeneration impact |
|---|---|---|
| $V_{LL} < V_{TV} \leq V_{LVN}$ | Target vehicle can move unhindered | Full unhindered regeneration possible |
| $V_{TV} \geq V_{LVN}$, $V_{LVN} < V_{LL}$ | Traffic slowing down ahead, and may include stopped vehicles. Target vehicle may merge with LVN in the future. | Partial regenerations possible. Optimal policy based decision making may be used to determine regeneration paramters |
| Known destination | Final destination is known. | Regeneration based on route knowledge and regeneration parameters (soot load, regeneration benefit) |
| Detours | Information from GPS/Social media may be used to predict vehicle stops | Detours may lead to stops forcing a regeneration termination. Drive/destination projections may be utilized for determining optimal regeneration termination policies. |

FIG. 6

SYSTEMS AND METHODS FOR OPPORTUNISTIC DIESEL PARTICULATE FILTER REGENERATION

FIELD

The present description relates generally to methods and systems for controlling a vehicle to perform regeneration of a diesel particulate filter based on vehicle network information.

BACKGROUND AND SUMMARY

Emission control devices, such as diesel particulate filters (DPF), may reduce the amount of soot emissions from a diesel engine by trapping soot particles. Such devices may be regenerated during operation of the engine, to decrease the amount of trapped particulate matter. Regeneration is typically achieved by raising a temperature of the DPF to a predetermined level, maintaining the temperature at the predetermined level, and ensuring that exhaust gas entering the DPF is of a certain composition in order to burn or oxidize the particulate matter.

One approach for controlling filter regeneration includes initiating a regeneration event in response to an amount of particulate in the filter increasing above a threshold amount, and terminating the regeneration event in response to the amount of particulate decreasing below the threshold amount or in response to vehicle operating in conditions that are not favorable for regeneration such as during idle stop conditions.

However, the inventors herein have recognized issues with such an approach. For example, during vehicle operation when conditions for sustained full regeneration are seldom available, such as during urban driving conditions including frequent idle stops and light load operation, regenerating based on soot load may induce frequent premature regeneration terminations before the DPF is fully regenerated. The premature terminations result in increased regeneration frequency leading to increased regeneration fuel penalty (RFP), and reduced fuel economy.

In one example, the above issues may be at least partially addressed by a method, comprising: selectively regenerating a diesel particulate filter based on a soot load, a predicted destination distance, and an estimated ability to maintain a desired vehicle speed greater than a threshold speed for a threshold duration, the particulate filter receiving exhaust from an engine combusting diesel fuel, wherein the estimation is based on a current vehicle speed, and an average vehicle network speed of other vehicles within a vehicle to vehicle network. In this way, by utilizing information from the vehicle network, intelligent decisions related to DPF regeneration including initiation and termination of regeneration may be made for reduced RFP and improved fuel economy.

As an example, a control network (e.g., CAN) of a target vehicle including a DPF may be connected to a vehicle-to-vehicle network including a group of vehicles travelling ahead of the target vehicle and within a threshold distance. Further, the control network of the target vehicle may be connected to a vehicle navigation system linked to a global positioning system providing travel route information and location information. In response to a soot load greater than a threshold amount, opportunistic regeneration parameters including cost of regeneration, and cost of filling the DPF under current vehicle operating conditions may be determined. The cost of regeneration may be based on current vehicle operating conditions including the soot load, exhaust temperature, pressure difference across the DPF; and further based on information from the vehicle-to-vehicle network including an estimated ability to maintain a desired vehicle speed for a threshold duration. In response to the cost of regeneration decreasing below the cost of filling, DPF regeneration may be initiated, and in response to the cost of regeneration increasing above the cost of filling, DPF regeneration may be terminated. Further, a degree of regeneration (e.g., full regeneration, partial regeneration) may be determined based on the estimated ability.

In this way, when the soot load is within a regeneration range, information from the vehicle-to-vehicle network and the vehicle navigation system may be utilized to perform opportunistic regenerations so as to reduce the frequency of premature regeneration terminations, and to identify and improve efficiency of partial regeneration opportunities, and thereby, reduce regeneration fuel penalty and improve fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows example degrees of regeneration during various vehicle operating conditions.

DETAILED DESCRIPTION

Figure 1:
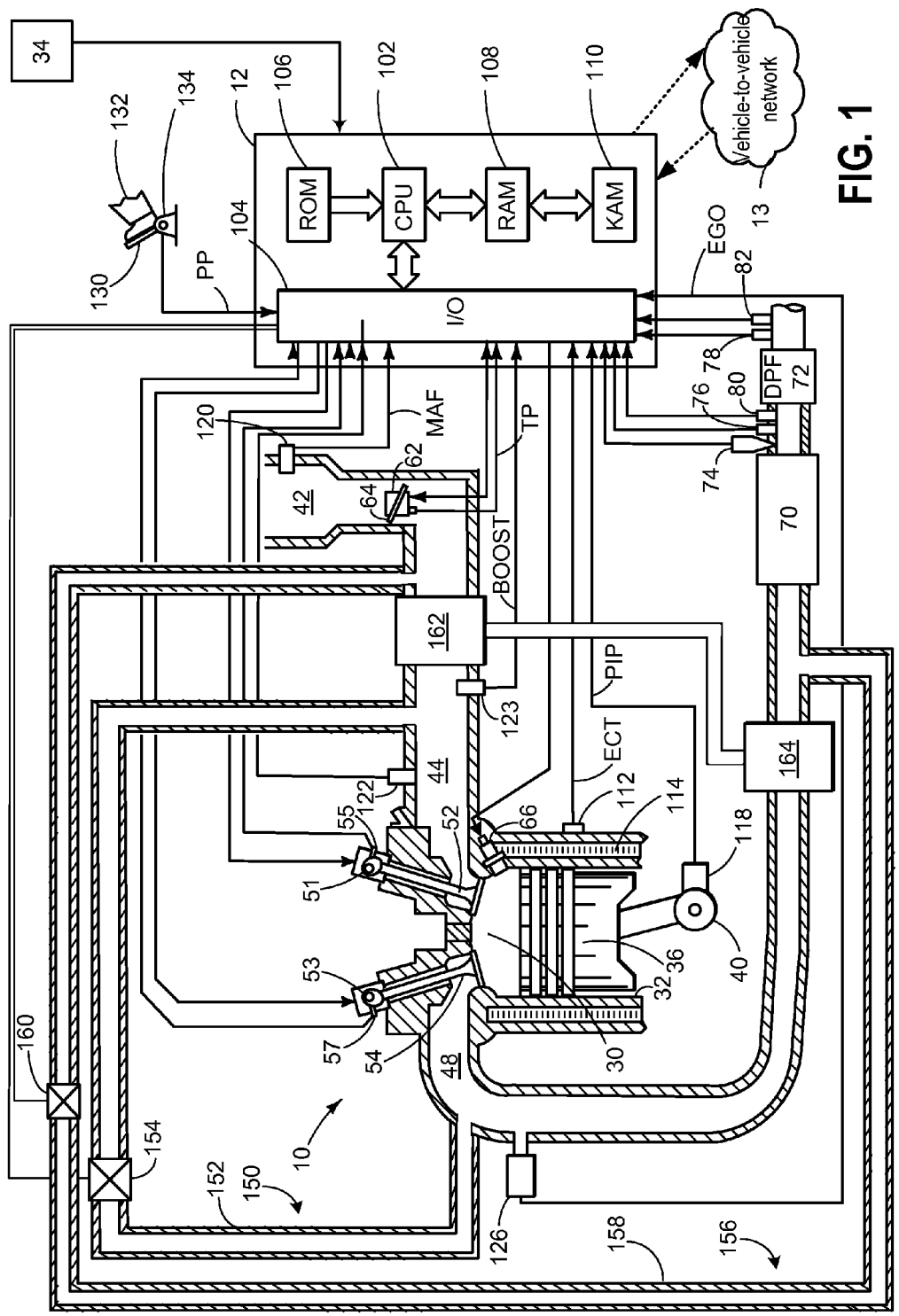
FIG. 1 shows a schematic depiction of an internal combustion engine combusting diesel fuel, and including a DPF for receiving exhaust from the engine and filtering particulate matter from the exhaust.
Figure 2:
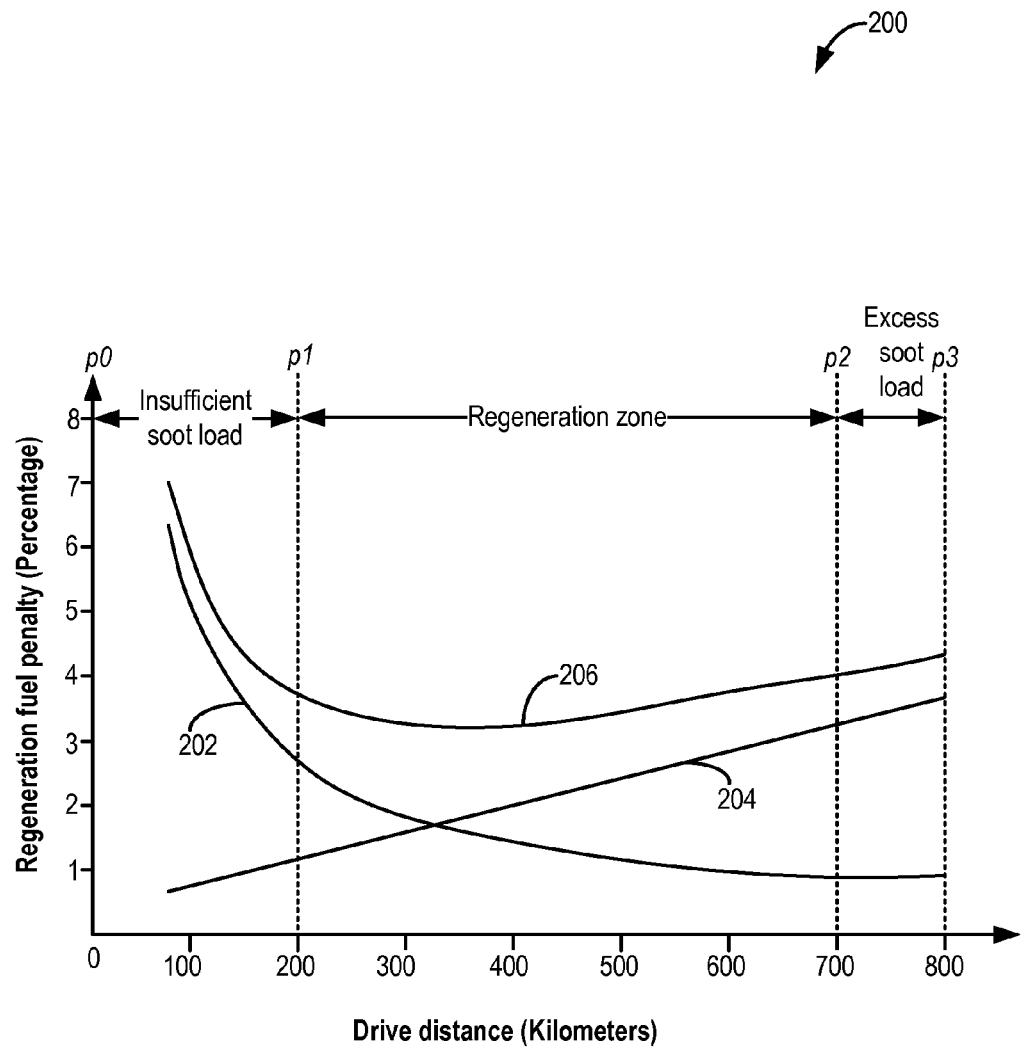
FIG. 2 shows an example graph illustrating regeneration fuel penalty during a drive cycle of a vehicle including the engine shown at FIG. 1.

Particulate filter regeneration may occur during operation of a turbocharged engine such as shown in FIG. 1 to decrease the amount of trapped particulate matter. As shown in the example of FIG. 2, the engine may incur a regeneration fuel penalty (RFP) during regeneration. In order to reduce the RFP, may be configured to perform a control routine, such as the routine of FIG. 3 and example method of FIG. 4 to perform opportunistic regeneration based on driver behavior determined based on traffic information from a vehicle-to-vehicle network communicatively coupled to the vehicle and/or navigation information of the vehicle. Example opportunistic regeneration based on vehicle network and navigation information is shown at FIG. 5, and example regeneration impact during various vehicle operating conditions and vehicle network operating conditions is shown at FIG. 6. By utilizing the systems and methods disclosed herein, the technical effect of reducing regeneration fuel penalty and improving fuel economy by reducing a frequency of terminated regenerations may be achieved.

Turning now to FIG. 1, a schematic diagram showing one cylinder of multi-cylinder internal combustion engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include fixed cam timing, or may include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail, which may be a common fuel rail.

Intake manifold 44 may include a throttle 62 having a throttle plate 64. However, in other examples, the throttle may be located in intake passage 42. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air and/or EGR provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

In this embodiment the engine is a diesel engine configured to combust diesel fuel (e.g. petroleum diesel or bio-diesel) via compression ignition. Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may include a diesel oxidation catalyst (DOC) and a selective catalytic reduction (SCR) catalyst. An ammonia (or urea) delivery system may be coupled to the SCR catalyst or upstream of the SCR catalyst to deliver reductant to the SCR catalyst.

At least one diesel particulate filter (DPF) 72 may be coupled downstream of the emission control device 70 in order to trap soot. The DPF may be manufactured from a variety of materials including cordierite, silicon carbide, and other high temperature oxide ceramics. As such, the DPF has a finite capacity for holding soot. Therefore, the DPF may be periodically regenerated in order to reduce the soot deposits in the filter so that flow resistance due to soot accumulation does not reduce engine performance. Filter regeneration may be accomplished by heating the filter to a temperature that will burn soot particles at a faster rate than the deposition of new soot particles, for example, 400-600° C. In one example, the DPF can be a catalyzed particulate filter containing a washcoat of precious metal, such as platinum, to lower soot combustion temperature and also to oxidize hydrocarbons and carbon monoxide to carbon dioxide and water.

While DPF regeneration is required for improved engine performance, it may add to the overall fuel cost. For example, a direct regeneration fuel penalty (RFP) may be associated with initiating and maintaining a regeneration event. RFP for initiating and maintaining regeneration may be higher when the vehicle has just started and the exhaust temperature is below a regeneration threshold as more fuel may be required to increase maintain regeneration temperatures. Further, during high soot load conditions (e.g., due to delayed regenerations), an indirect RFP may be associated with increased back pressure caused by the high soot load. An example graph 200 showing RFP as a function of exhaust temperature, and exhaust back pressure is shown at FIG. 2.

Specifically, graph 200 of FIG. 2 shows RFP (along the y-axis) at different drive distance from the start of a drive cycle (along the x-axis). Plot 202 illustrates RFP based on exhaust temperature, plot 204 illustrates RFP based on exhaust back pressure, and plot 206 illustrates total RFP based on exhaust temperature and back pressure. Distance between vertical markers p0-p1, p1-p2, and p2-p3 represents phases of interest during the drive cycle.

RFP based on exhaust temperature (plot 202) may be high at the start of the drive cycle, between p0 and p1, when the exhaust temperatures are below a regeneration threshold (that is, when exhaust temperatures are not favorable for regeneration), relative to a phase in the drive cycle after the vehicle has traveled a threshold distance or has been operating for a threshold duration (e.g., after p1). For example, between p0 and p1, the vehicle may be operating under cold start conditions. Consequently, more fuel may be utilized to generate additional exhaust energy required for DPF regeneration than when the vehicle has been traveled the threshold distance (or has been driven for the threshold duration) and has warmed up (e.g. after p1). As a result, when the vehicle has just started the drive cycle (e.g., between p0 and p1), RFP based on exhaust temperature may be higher and the total RFP (based on exhaust temperature and exhaust back pressure) may be higher relative to vehicle operating conditions when the vehicle has traveled the threshold distance and/or has been operating for the threshold duration (e.g. after p1) due to increased exhaust temperature. Further, the RFP during cold start conditions may be higher due to a state of the DOC. For example, during cold start conditions, additional fuel may be utilized to increase a temperature of the DOC in order to reach a catalyst light-off temperature. In other words, for a cold system extra fuel must be spent to first get the DOC to light off before any appreciable exotherm over the DOC light-off temperature can be established for DPF regeneration.

RFP based on exhaust back pressure (plot 204) may increase if the start of regeneration is delayed. For example, if the DPF is not regenerated before p2, soot accumulation may be excessive. The excessive soot accumulation may increase exhaust back pressure, with the impact of increasing engine pumping losses. Therefore, when regenerating the DPF filter in the excessive soot load zone (that is, between p2 and p3), the RFP based on exhaust back pressure may increase, and the total RFP (based on exhaust temperature and exhaust back pressure) may increase. As a result, engine performance may be reduced, thereby decreasing fuel economy.

During vehicle operation between p1 and p2, the vehicle may be operating in the regeneration zone with higher exhaust temperatures than between p0 and p1, and without excessive soot load (e.g. between p2 and p3). Therefore, the total RFP (plot 206) based on exhaust temperature and exhaust back pressure in the regeneration zone between p1 and p2 may be lower than the total RFP between p0 and p1 when vehicle is operating cold and the total RFP between p2 and p3 when excessive soot load is accumulated. For example, if regeneration is delayed (that is, if the DPF is not regenerated between p1 and p2, excessive soot may accumulate. Consequently, a forced and necessary regeneration must be enforced to prevent severe derating of engine power due to excessive backpressure.

Therefore, in order to reduce fuel penalty for initiating and maintaining DPF regeneration, the DPF may be regenerated in the regeneration zone (e.g. between p1 and p2) when the vehicle has warmed up and the soot load is not excessive. For example, the DPF regeneration may be initiated in response to one or more of the exhaust temperature greater than the threshold regeneration temperature, a soot load greater than threshold load, a pressure differential across the DPF greater than a threshold pressure difference, and the distance traveled by the vehicle in a drive cycle greater than a threshold distance so that the DPF regeneration takes place in the regeneration zone for reduced RFP.

However the inventors herein have identified potential issues that may arise when regenerating based on soot load, exhaust temperature and/or exhaust back pressure alone. As an example, in addition to increased fuel penalty during cold vehicle operation and delayed regeneration cycles, total RFP may be increased due to frequent regeneration aborts. For example, the vehicle may enter vehicle operation conditions that are not optimal for regeneration (e.g., urban driving scenarios including frequent stops). In response to the non-optimal regeneration conditions, an active regeneration cycle may be terminated before completion. Therefore, without knowledge of driver intent or upcoming traffic patterns, DPF regeneration may be terminated shortly after initiation, and the cycle of regeneration initiation and termination may occur more frequently than desired resulting in degraded fuel economy and reduced engine performance.

In one example, the above issues may be addressed by determining a start time for regeneration, a stop time for regeneration, and a degree of regeneration of a DPF receiving exhaust from an engine combusting diesel fuel based on a cost based metric derived based on traffic information (also referred to herein as traffic preview) determined from a vehicle-to-vehicle network linked to controller 12 via a vehicle control network (e.g. a CAN system), and/or destination, location, and/or route information (also referred to herein as navigation preview) determined from a navigation system linked to controller 12 via the vehicle control network. In some examples, the navigation system may include an in-vehicle navigation system linked to a global positioning system (GPS). In other examples, additionally, or alternatively, the navigation system may include a blue tooth device communicating with the GPS.

In this way, by utilizing traffic information and/or navigation information, a number of DPF regeneration termination events may be reduced. Consequently, the DPF may be regenerated with increased efficiency resulting in improved fuel economy. Details of regenerating the DPF based on traffic and/or navigation preview will be further elaborated with respect to FIGS. 3-6.

In one example, regeneration may be initiated only when it is estimated that desired conditions for regeneration are available for a duration greater than a threshold duration in order to reduce the number of attempts to regenerate the DPF. For example, information from a vehicle to vehicle network may be utilized to estimate the duration when optimal conditions may be present for regeneration based on a traffic and/or navigation preview.

Returning to FIG. 1, a hydrocarbon (HC) reductant delivery system 74 may be used to deliver HC from the fuel tank or from a storage vessel to the exhaust system to generate heat for heating the particulate filter 72 for regeneration purposes. Alternatively, or in addition, late fuel injection (e.g., during an exhaust stroke) may be used to raise exhaust temperature.

Temperature sensors 76 and 78 may be located upstream and downstream, respectively of DPF 72. The temperature sensors 76 and 78, or additional temperature sensors, may also be located within the DPF, or DPF temperature (or exhaust temperature) may be estimated based on operating conditions using an exhaust temperature model. A differential pressure signal is shown being determined from pressure sensors 80 and 82 upstream and downstream of DPF 72, respectively. Note that a single differential pressure may also be used to measure the differential pressure across DPF 72. A single port gauge pressure sensor (SPGS) may also be used.

It should be appreciated that alternate emission control system configurations may be used in alternate embodiments. For example, emission control device 70 may be coupled downstream of the DPF. Further in other examples, a plurality of diesel particulate filters may be included in the emission control system. Still further, in other examples the SCR catalyst may not be included in the emission control system. Each catalyst, filter, etc., may be enclosed within a single housing or alternatively may be enclosed via separate housings. It will be appreciated that numerous configurations are possible and the configuration depicted in FIG. 1 is exemplary in nature. Further still, as noted above, a reductant (e.g., ammonia or urea) injection system may be coupled to the exhaust to inject urea upstream of emission control device 70.

To regenerate the DPF a regeneration injection strategy may be implemented. The regeneration injection strategy may implement an injection profile including a plurality of injection events such as a pilot fuel injection, a main fuel injection, a near post fuel injection, and/or a far post fuel injection. It will be appreciated that the aforementioned fuel injections may include a plurality of injection events, in other embodiments. Thus, the DPF may be regenerated during operation of the engine. For example, the temperature downstream of a DOC and upstream of a DPF may be controlled to a desired value to promote combustion of particulate matter within the DPF, by adjustment of the amount of the various injections. In this example, a temperature set-point downstream of the DOC and upstream of the DPF may be established to facilitate regeneration of the DPF.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

Engine 10 may further include a high pressure EGR system 150. High pressure EGR system 150 includes an EGR conduit 152 coupled to the exhaust 48 upstream of turbine 164 and coupled to the intake 44 downstream of compressor 162. High pressure EGR system 150 may include an EGR valve 154 disposed along EGR conduit 152 to control exhaust flow through EGR system 150. Engine 10 may also include a low pressure EGR system 156. Low pressure EGR system 156 includes an EGR conduit 158 coupled to the exhaust 48 downstream of turbine 164 and coupled to the intake 44 upstream of compressor 162. Low pressure EGR system 156 may include an EGR valve 160 disposed along EGR conduit 152 to control exhaust flow through EGR system 156.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 106 can be programmed with computer readable data representing instructions executable by processor 102 for performing the methods and control strategies described below as well as other variants that are anticipated but not specifically listed.

In addition, controller 12 may receive data from the GPS 34 and/or a vehicle-to-vehicle network such as an off-board cloud network 13.

As described above, FIG. 1 shows only one cylinder of a multi-cylinder engine; however it should be appreciated that each cylinder may similarly include its own set of intake/exhaust valves, fuel injector, spark plug, etc.

In one example, the system of FIG. 1 provides for a system for a vehicle, comprising: an engine having an exhaust; a particulate filter coupled in the exhaust downstream of an emission control device; a communication module for communicatively coupling the vehicle to an off-board cloud network and for communicatively coupling the vehicle to a navigation system; and a computer readable storage medium having instructions encoded thereon for controlling regeneration of the particulate filter, including: instructions to initiate particulate filter regeneration in response to an amount of stored particulate and an estimated ability to maintain a cost of regeneration lower than a cost of filling the filter for a duration greater than a threshold duration; instructions to terminate the particulate filter regeneration in response to one or more of the amount of stored particulate falling below a threshold percentage of stored particulate, and the cost of regeneration increasing above the cost of filling; wherein, the threshold percentage of stored particulate is based on a particulate burning rate.

The system further includes instructions for determining the cost of regeneration based on a predicted behavior of a vehicle operator, the behavior determined based on a current vehicle speed, an average speed of a lead vehicle network including one or more vehicles travelling ahead of the vehicle and communicating with the cloud network, a current location of the vehicle, a destination of the vehicle, and a travel history which includes a driving history of the vehicle and a driving history of the vehicle operator.

Figure 3:
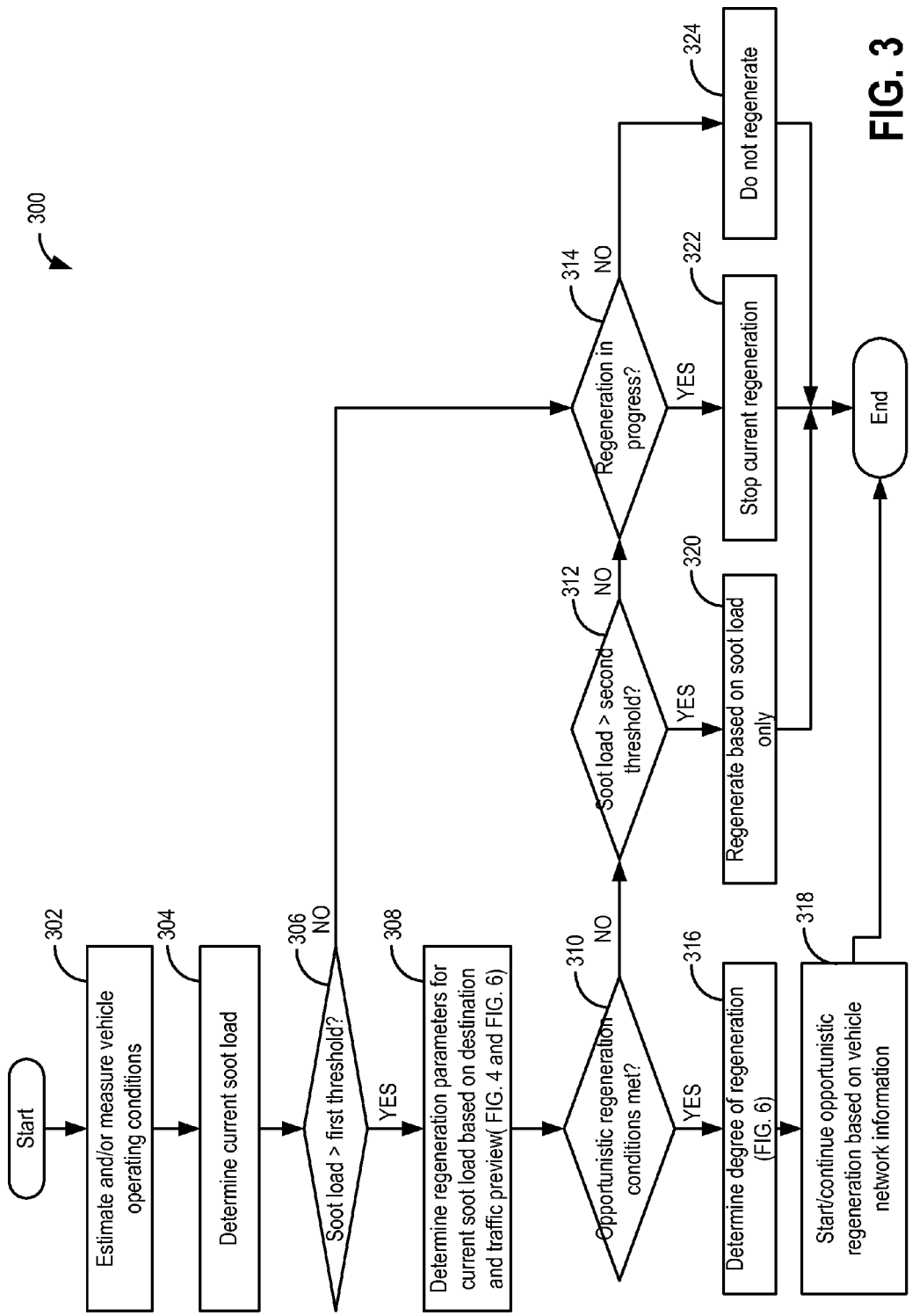
FIG. 3 shows a flow chart illustrating an example method for performing opportunistic regeneration of the DPF.

Turning to FIG. 3, an example method 300 for regeneration of a DPF (e.g., DPF 72 shown at FIG. 1) included in a vehicle based on traffic and/or navigation preview information from a vehicle-to-vehicle network and/or a vehicle navigation system is shown. The method of FIG. 3 may be included in the system of FIG. 1 as executable instructions stored in non-transitory memory of a controller such as controller 12 depicted at FIG. 1.

At 302, method 300 includes estimating and/or measuring vehicle operating conditions. The estimated conditions may include, for example, engine speed (Ne), vehicle speed (Vs), engine temperature, combustion air-fuel ratio (AFR), exhaust catalyst temperature, ambient conditions, pressure drop across the DPF filter, pedal position, etc.

Method 300 then proceeds to 304 to determine a current soot load, e.g., the amount of stored particulate in the DPF. The current soot load may be determined by a variety of approaches. In one example, the soot load may be based on the current stored particulate amount and the incremental amount of particulates generated per predetermined sampling time during the combustion process. In this example, the incremental amount of particulates generated per predetermined sampling time may be based on engine operating conditions such as fuel injection amount and engine speed.

In another example, if regeneration is in progress, the soot load may be determined by including the particulates generated by the combustion process, the current stored particulate amount, and the amount of particulates released during the regeneration stage; wherein, the amount of particulates generated during the combustion process may be determined based on engine operating conditions such as fuel injection amount and engine speed; and wherein, the amount of released particulates during the regeneration process may be determined based on exhaust gas space velocity and particulate filter temperature.

Upon determining the current soot load, method 300 may proceed to 306. At 306, method 300 may include determining if the current soot load is greater than a first threshold amount, the first threshold being lower than a second higher threshold discussed below). If the answer at 306 is YES, method 300 proceeds to 308. At 308, method 300 includes determining regeneration parameters for current soot load based on traffic preview and/or destination preview. The regeneration parameters may include a regeneration favorability factor (RFF), a cost of filling the DPF, and a cost of regenerating the DPF.

The RFF may be a conditional probability of achieving X % (percentage) regeneration (that is, a desired amount of regeneration) based on a traffic information and/or a navigation information from a vehicle-to-vehicle network, and the current soot load, wherein a value of X may be greater than zero and less than or equal to one hundred (that is, $0 < X \leq 100$). As an example, RFF may be defined as:

$$RFF = P(X\%/1,2,3),$$

Wherein P(X %/1, 2, 3) is the conditional probability of achieving X % regeneration given conditions 1, 2 and 3. For example, condition 1 may include a distance remaining to reach a final destination (or a potential destination based on past drive history if the final destination is not known) greater than a threshold distance; condition 2 may include one or more of an average vehicle network speed of a lead vehicle network (LVN) greater than a threshold network speed, an average network load greater than a threshold network load, and an average network exhaust temperature greater than a threshold network exhaust temperature; and condition 3 may include a probability of detour greater than a threshold probability.

Further, if the final destination is known, and the soot load is within the regeneration limits (e.g., greater than the first threshold), then RFF may be determined based on a remaining distance from a current location to the final destination (e.g., as the distance decreases, RFF may decrease since the regeneration may not be completed before reaching the destination, thereby contributing to an increase in a probability of forced termination); the probability of detours given past driving history and a current GPS route information; a probability of unhindered regeneration based on the current traffic information of the lead vehicle network of vehicles travelling ahead of the vehicle within a threshold distance, and the remaining distance from the destination; engine load requirements (for example, increasing grade requires higher engine load and may result in hotter exhaust which may increase RFF); and a current thermal state of the vehicle (for example, higher exhaust temperature conditions may increase RFF). If the final destination is not known, and the soot load is within regeneration limits, then the RFF may be determined based on a distance remaining to potential stop destinations (for example, RFF may decrease as the remaining distance to the potential destination decreases), wherein the potential stop destinations may be based on past drive history; the traffic information from the lead vehicle network (for example, traffic information may include the average vehicle network speed, the average vehicle network speed relative to the vehicle speed, the average load, and the average exhaust temperature of the vehicle network); and a probability of detour (for example, as the probability of detour increases, RFF may decrease as detours may lead to a stop, thereby forcing regeneration termination) and an impact due to the detour based on a learning algorithm (for example, a probability of a generation abort responsive to an impending stop scenario. An increase in probability of regeneration abort may decrease RFF).

In one example, the RFF may be utilized to determine a degree of regeneration. Details of determining the degree of regeneration will be further elaborated with respect to step 316 of FIG. 3, and FIG. 6.

The cost of filling the DPF may be a projected cost of filling the DPF, and may include an increased probability of having to undergo forced and critically necessary regeneration due to incremental soot load approaching a high threshold (e.g., the second higher threshold). The forced regenerations may have a high probability of inefficient operation; hence the projected cost of filling may increase as the soot load increases above the first threshold. Further, at the current soot load, and an estimated soot accumulation rate (the accumulation rate based on current vehicle operating conditions and/or navigation information (including destination information) from a navigation system (e.g., GPS)), an estimation of a remaining horizon (e.g., remaining drive distance, remaining duration etc.) before a forced regeneration may become necessary may be determined. For example, a predicted duration less than a threshold predicted duration may increase the cost of filling. That is, as the predicted duration decreases, the cost of filling may increase. Still further, filling the DPF may also increase a regeneration burden for a next regeneration event, thereby increasing the probability of a partial regeneration due to longer regeneration duration required for higher soot loads. In other words, as the soot load increases, longer regeneration durations may be required. Therefore, a probability of partial regeneration may increase, and consequently, the cost of filling may increase. Still further, filling the DPF may also increase exhaust back pressure, thereby reducing efficient engine operation due to higher pumping loses.

The cost of regeneration may be a projected cost of regeneration and may include a fuel cost to light-off the DOC before a regeneration temperature can be generated over the DOC temperature. Therefore, the cost of regeneration may be based on the DOC temperature. For example, during cold start operations, additional fuel may be required to light-off DOC before a regeneration temperature is established. Therefore, an amount of fuel required to increase the exhaust temperature to the regeneration may be higher during cold start operation than during vehicle operation when the DOC has attained the light-off temperature. Consequently, the cost of regeneration during cold DOC conditions (e.g., during cold starts) may be greater than the cost of regeneration during conditions after DOC light-off is achieved as less fuel may be required to attain the regeneration temperature after the DOC light-off. Further, the cost of regeneration may include a fuel cost to achieve X % regeneration at current soot load conditions. For example, cost of regeneration at a given soot load less than the first threshold when insufficient soot load is present (e.g., between p0 and p1 at FIG. 2) may be greater than the cost of regeneration at a given soot load greater than the first threshold (e.g., in the regeneration zone between p1 and p2 at FIG. 2) since the exotherm once generated may not be completely utilized for lower soot loads.

In one example, a regeneration fuel penalty optimizer function may utilize traffic information from the vehicle-to-vehicle network (e.g., a target vehicle speed (that is, speed of the vehicle including the DPF for which the regeneration parameters are being determined), speed of the lead vehicle network, distance between the target vehicle and the lead vehicle network, etc.), and/or navigation information from a vehicle telematics system including a global positioning system (current longitude, current latitude, destination longitude, destination latitude, drive history, probability of detour, impact due to detour, etc.) and a wireless communication network system in order to determine the regeneration parameters. Further, the fuel penalty optimizer may utilize, as input, current soot load information from a soot accumulation modelling function based on engine speed, pedal position, vehicle speed, fuel injection amount, post fuel injection amount, particulate filter temperature, exhaust gas temperature, etc. to determine the regeneration parameters. Upon determining the regeneration parameters for current soot load based on the traffic information, and/or navigation information, the regeneration parameters (RFF, the projected cost of filling, and the projected cost of regeneration) under current soot load conditions may be updated by the controller. Upon updating the regeneration parameters, method 300 may proceed to 310. At 310, method 300 may include determining if opportunistic regeneration conditions have been met. For example, opportunistic regeneration conditions may include determining if the cost of regenerating the DPF is less than the cost of filling the DPF under current operating conditions. In some examples, opportunistic regeneration conditions may include determining if the cost of regenerating the DPF is less than the cost of filling at current operating conditions, and may further include determining if a probability of the cost of regenerating remaining less than the cost of filing for a regeneration duration (and/or a distance) greater than a threshold regeneration duration (and/or threshold regeneration distance) from a current time point (and/or location) is greater than a threshold probability. In some other examples, opportunistic regeneration conditions may include determining if a difference between the cost of filling and the cost of regeneration is greater than a threshold difference, and may further include estimating if the difference may remain greater than the threshold difference for the regeneration duration (and/or the regeneration distance) greater than the threshold regeneration duration (and/or the threshold regeneration distance) from the current time point (and/or location). In this way, the cost of filling and the cost of regenerating determined based on driver behavior (determined from the traffic and/or navigation preview information) and vehicle operating conditions may be utilized to evaluate optimality of regeneration.

While the cost of filling and the cost of regeneration may be utilized to determine opportunistic regeneration conditions as discussed in the examples above, it will be appreciated that in some examples, the opportunistic regeneration conditions may additionally or alternatively include determining if the RFF is greater than a threshold probability. That is, the opportunistic regeneration conditions may be based on the cost of filling, the cost of regeneration, and/or the RFF. In some other examples, opportunistic regeneration conditions may include determining if a degree of regeneration is greater than a threshold degree, wherein the degree of regeneration may be determined based on the RFF. Details of determining the degree of regeneration will be further elaborated with respect to step 316 at FIG. 3 and at FIG. 6. In other words, it may be determined if an amount of regeneration that may be possible under current vehicle and network operating conditions is greater than a threshold amount.

Further, in some other examples, the opportunistic regeneration conditions may include estimating an ability of the vehicle to maintain a vehicle speed greater than a threshold speed for a threshold duration, wherein the estimation may be based on the vehicle speed, and an average speed of other vehicles within a vehicle to vehicle network.

If the answer at 310 is YES then opportunistic regeneration conditions are satisfied, and accordingly, method 300 may proceed to 316. At 316, a degree of regeneration may be determined. The degree of regeneration may indicate an amount of regeneration that may be performed. The degree of regeneration may be based on the RFF, wherein the RFF is based on the current soot load, and the vehicle traffic information and/or navigation information. For example, as the RFF increases, more regeneration may be performed and hence, the degree of regeneration may increase. In one example, it may be determined if a full unhindered regeneration is possible, if a partial regeneration is possible, if a partially deterministic regeneration is possible, or if a regeneration termination is imminent. Details of determining the degree of regeneration will be further elaborated with respect to FIG. 6.

Upon determining the degree of regeneration, method 300 may proceed to 318. At 318, method 300 may include starting a DPF regeneration cycle or continuing the regeneration cycle based on vehicle network information with fuel control to reflect updated value of a desired regeneration amount as available from the updated RFF.

Further, the decisions related to DPF regeneration such as starting the regeneration cycle, stopping the regeneration cycle, and the degree of regeneration may be based on the traffic and navigation information.

Returning to 306, if the answer at 306 is NO then soot load is not greater than the first threshold amount, and accordingly, method 300 proceeds to 314. At 314, method 300 includes determining if regeneration is in progress. If the answer at 314 is YES then regeneration is in progress and in response to the soot load being less than the first threshold, current DPF regeneration may be stopped. For example, if post fuel injection is utilized to regenerate DPF, upon determining that the soot load is less than the threshold, post fuel injection may be stopped. If the answer at 314 is NO then regeneration is not in progress, and accordingly the method may return without regenerating the DPF.

Returning to 310, if opportunistic regeneration conditions are not met, method 300 may proceed to 312. For example, if it is determined that the cost of regenerating is greater than the cost of filling, if RFF is less than the threshold probability, and/or if the probability of the cost of regenerating remaining less than the cost of filing for the regeneration duration (and/or the regeneration distance) greater than the threshold regeneration duration (and/or threshold regeneration distance) from the current time point (and/or destination) is less than the threshold probability, method 300 may proceed to 312. At 312, method 300 may include determining if the current soot load is greater than a second threshold amount. The second threshold may be the maximum soot load that can be tolerated without regeneration given the current backpressure and engine drive parameters. Therefore, the second threshold may be a function of engine speed, torque demand, and soot load. That is Second threshold=f (N, torque, soot load). If the answer at 312 is YES then an excess soot load condition is imminent or underway, and accordingly, method 300 may proceed to 320. At 320, method 300 may regenerate based on soot load only in order to maintain DPF filter trapping efficiency. That is, if soot load is greater than the second threshold, then priority may be given to DPF regeneration based on soot load over DPF regeneration based on traffic information and/or navigation information.

If the answer at 312 is NO then method 300 may proceed to 314 to determine if DPF regeneration is in progress. If the answer at 314 is YES then regeneration is in progress and in response to the soot load being less than the second threshold, current DPF regeneration may be stopped. For example, if soot load is not greater than the second threshold, priority may be given to RFP, and accordingly, current soot regeneration may be stopped until opportunistic regeneration conditions are met or until soot load increases above the second threshold. In one example, if post fuel injection is utilized to regenerate DPF, upon determining that the soot load is less than the second threshold, post fuel injection may be stopped. If the answer at 314 is NO then regeneration is not in progress, and accordingly the method may return without regenerating the DPF.

In this way, intelligent decision related to DPF generation may be determined based on soot load, an estimated ability maintain favorable regeneration conditions based on traffic information from the vehicle-to-vehicle network, navigation information from the vehicle navigation system, and evaluating a trade-off between regenerating and not regenerating based on the cost of regenerating and the cost of filling the DPF. As a result, the number of premature regeneration terminations may be reduced and efficiency of regeneration may be increased.

In one example, the method of FIG. 3 may provide for a method for a vehicle comprising: during a first condition, performing regeneration of a particulate filter based on an amount of soot accumulated in the particulate filter, and a cost based opportunistic regeneration condition; during a second condition, performing regeneration based on the amount of soot accumulated and not based on the cost based opportunistic regeneration condition; and wherein, the cost based regeneration condition is determined based on one or more of a traffic information of a vehicular network including the vehicle, and one or more vehicles travelling ahead of the vehicle within a threshold distance, and a destination information of a destination of the vehicle.

The method further includes wherein the first condition includes the amount of soot greater than a first threshold amount and less than a second threshold amount; and wherein the second threshold amount is greater than the first threshold amount; wherein the second condition includes the amount of soot greater than the second threshold amount.

The method further includes wherein determination of the cost based opportunistic regeneration condition includes determining a first cost of filling the filter, and a second cost of regenerating the filter; wherein the first cost of filling is based on a probability of forced regeneration, a probability of partial regeneration, and an estimated impact of filling the filter on an efficiency of an engine in the vehicle; and wherein the second cost of regeneration is based on a first fuel cost to attain a diesel oxidation catalyst light off temperature, and a second fuel cost to achieve a desired regeneration amount.

The method further comprises starting regeneration of the filter in response to the second cost of regenerating decreasing below the first cost of filling; stopping regeneration of the filter in response to the second cost of regenerating increasing above the first cost of filling, or in response to an estimated duration of the second cost of regenerating remaining below the first cost of filling less than a threshold duration.

The method further includes wherein determination of the cost based opportunistic regeneration condition includes determining a conditional probability of achieving a desired amount of regeneration based on a distance remaining to reach a final destination, a mean vehicle network speed of a lead vehicle network, a mean network load of the lead vehicle network, and a probability of detour; and further comprising regenerating the filter in response to the conditional probability increasing above a preselected probability.

Figure 4:
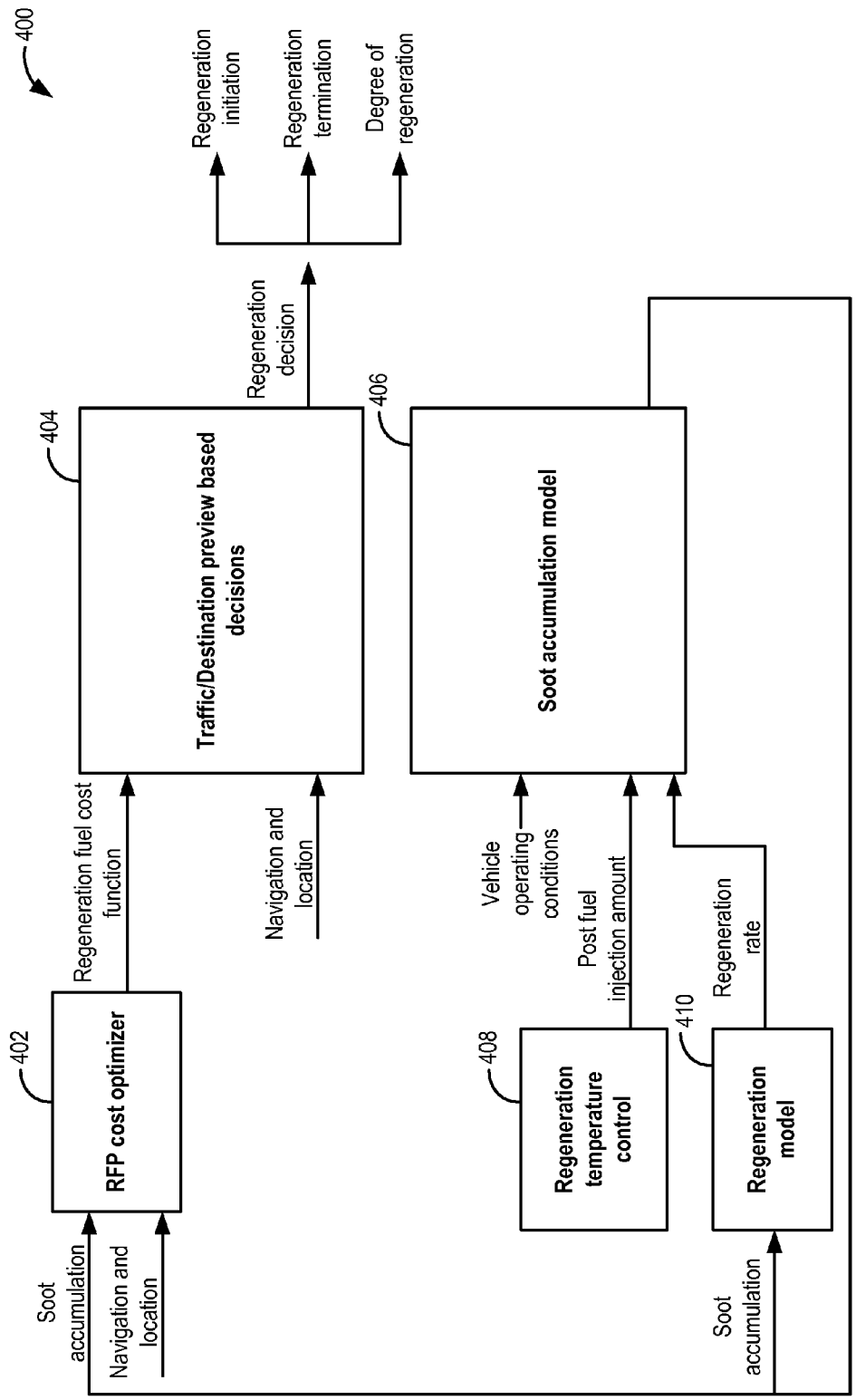
FIG. 4 shows a block diagram illustrating an example method for opportunistic regeneration based on traffic information and/or navigation information.
Figure 5:
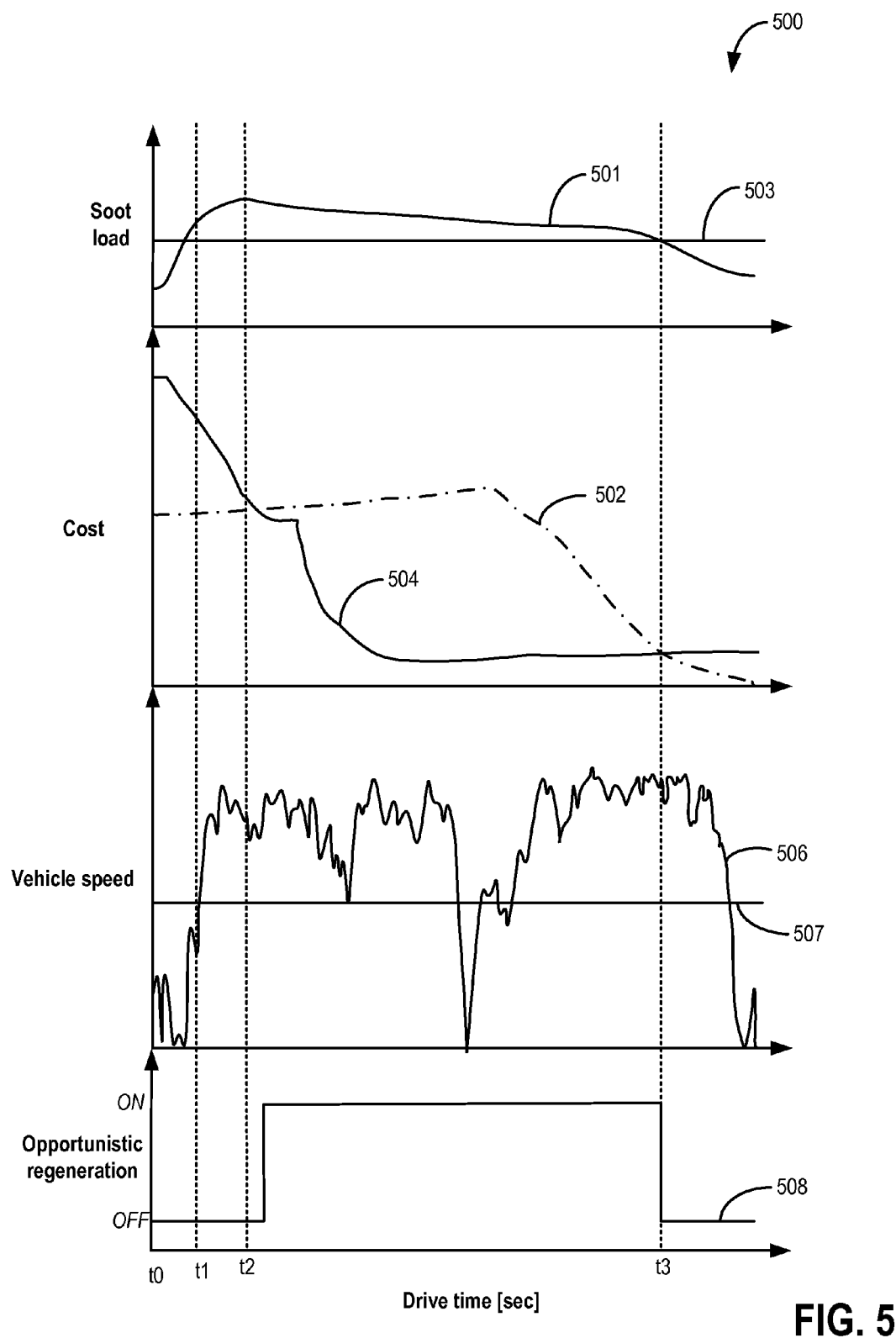
FIG. 5 shows an example operating sequence for performing opportunistic regeneration, according to the present disclosure.

Turning to FIG. 4, a block diagram depicting an example method 400 for opportunistic regenerations is shown. Method 400 may include utilizing traffic and/or navigation information based regeneration scheduler 404 to determine intelligent DPF regeneration decisions including regeneration initiation, regeneration termination, and a degree of regeneration. For example, regeneration scheduler 404 may receive input from a RFP cost optimizer 402, wherein the input from the optimizer may include a RFP cost function based on a cost of regeneration, and a cost of filling the DPF. Further, regeneration scheduler 404 may receive information from a vehicle navigation system as input, wherein the input from the navigation system may include current location, destination, and route information. Based on inputs from RFP cost optimizer 402, and vehicle navigation system, regeneration scheduler may determine a strategy for evaluating a trade-off between regenerating and not regenerating, may determine if regeneration may be performed, and if the decision to regenerate is made, the scheduler may determine an optimal window for regeneration and output decisions for DPF regeneration including a start of regeneration, a predicted stop of regeneration and a degree of regeneration.

In one example, if it is determined that the cost of regeneration is less than the cost of filling, and it is determined that the cost of regeneration may remain less than the cost of filling for a predicted duration greater than a first threshold duration, regeneration scheduler may determine that a full unhindered regeneration may be performed, and accordingly may determine a start time and stop time for regeneration.

In another example, if it is determined that the cost of regeneration is less than the cost of filling, and it is determined that the cost of regeneration may remain less than the cost of filling for a predicted duration less than the first threshold duration and greater than a second duration, regeneration scheduler 404 may determine that a partial regeneration may be performed. Additionally or alternatively, if a difference between the cost of filling and the cost of regeneration is less than a threshold difference, and if the cost of regeneration may remain less than the cost of filling for the predicted duration less than the first threshold duration and greater than a second duration, regeneration scheduler 404 may determine that a partial regeneration may be performed.

In yet another example, if it is determined that the cost of regeneration is less than the cost of filling, and it is determined that the cost of regeneration may remain less than the cost of filling for a predicted duration less than the second duration, regeneration scheduler 404 may determine that DPF regeneration may not be performed.

RFP cost optimizer 402 may receive soot accumulation information and navigation and location information as input, and may output a RFP cost function based on cost of filling and cost of regenerating the DPF. For example, during cold start conditions, when the vehicle has just started operation, the vehicle speed may be less than a threshold speed, and the exhaust temperature may not favor DPF regeneration. Further, the soot load may be less than the threshold load. Consequently, the cost of filling the DPF may be less than the cost of regenerating the DPF. However, if the soot load is greater than threshold, if the vehicle has warmed up to exhaust temperatures that may favor DPF regeneration, and if it is predicted (based on vehicle to-vehicle network and navigation data) that the vehicle may operate at a speed greater than a desired speed for a threshold operation duration, the cost of regenerating the DPF may decrease below the cost of filling.

A soot accumulation function 406 may determine a soot load (that is, an amount of particulate accumulated) based on vehicle operating conditions such as engine speed, pedal position, vehicle speed, engine off time, and exhaust temperature information. The soot load output from the soot accumulation function may be utilized as inputs to the RFP cost optimizer 402 discussed above and to a regeneration model 408. The regeneration model may determine a regeneration rate that may be subsequently input into the soot accumulation function in order to update the soot load (or soot accumulation amount).

In some examples, the regeneration decisions determined by regeneration scheduler 404 based on traffic and/or destination information may further include EGR optimization and boost pressure optimization.

In this way, by utilizing traffic information, navigation information, and soot load under current vehicle operating conditions, cost of regeneration and cost of filling the DPF may be determined which may be utilized to estimate a duration of availability of opportunistic regeneration conditions.

FIG. 5 shows an operating sequence 500 depicting an example determination of DPF regeneration based on a cost-based system including a cost of filling the DPF and a cost of regenerating the DPF. FIG. 5 illustrates example soot load at plot 501, cost for filling at plot 502, cost for regenerating at plot 504, vehicle speed at plot 506, and degree of regeneration at plot 508. The sequence of events in FIG. 5 may be provided by executing instructions in the system of FIG. 1 according to the method of FIG. 3. Vertical markers at times t0-t4 represent times of interest during the sequence. In all the plots discussed below, the X axis represents drive time of the vehicle and time increases from the left side of each plot to the right side of each plot.

The first plot from the top of FIG. 5 represents soot load (that is, amount of particulate accumulated in the DPF) versus time. The Y axis represents soot load and the soot load increases in the direction of the Y axis arrow. Horizontal line 501 represents a soot load threshold below which the DPF may not be regenerated.

The second plot from the top of FIG. 5 represents cost versus time. The Y axis represents cost and the cost increases in the direction of the Y axis arrow. Trace 502 represents cost of filling the DPF, and trace 504 represents cost of regenerating the DPF.

The third plot from the top of FIG. 5 represents vehicle speed versus time. The Y axis represents vehicle speed and the vehicle speed increases in the direction of the Y axis arrow. Horizontal line 507 represents a vehicle speed threshold.

The fourth plot from the top of FIG. 5 represents opportunistic regeneration conditions versus time. The Y axis represents an ON state when opportunistic regeneration may be performed and an OFF state when opportunistic regeneration may not be performed.

As such, the cost of filing may be the projected cost of filling, and may be based on a probability of forced regeneration, a probability of partial regeneration, and an estimated impact on engine efficiency due to increased exhaust back pressure resulting from soot accumulation (that is, a regeneration fuel penalty for accumulating particulate matter in the DPF). For example, the cost of filling may increase as the probability of forced regeneration increases. The forced regenerations may have a high probability of inefficient operation; hence the projected cost of filling may increase. Further, at the current soot load, and an estimated soot accumulation rate (the accumulation rate based on current vehicle operating conditions and/or navigation information (including destination information) from a navigation system (e.g., GPS)), an estimation of a remaining horizon (e.g., remaining drive distance, remaining duration etc.) before a forced regeneration may become necessary may be determined. For example, a predicted duration less than a threshold predicted duration may increase the cost of filling.

The cost of filling may increase with increased probability of partial regeneration. Partial regeneration may increase soot loads and hence, may increase a regeneration burden for the next regeneration due to longer regeneration duration required for higher soot loads. Further, filling the DPF may also increase exhaust back pressure, thereby reducing efficient engine operation due to higher pumping loses. Consequently, filling may increase RFP and hence, the cost of filling may increase.

The cost of regeneration may be the projected cost of regeneration, and may be based on a fuel cost to light-off the DOC, and a fuel cost to achieve X % regeneration at current soot load conditions. As such the fuel cost to achieve X % regeneration may be based on one or more of the traffic information and/or navigation information, drive time, vehicle speed, exhaust temperature, pressure drop across the DPF, and engine speed. The traffic preview may be based on information from a vehicle network including one or more vehicles travelling ahead of the target vehicle (also referred to herein as lead vehicle network (LVN)). Information from the vehicle network may include an average speed of the lead vehicle network, distance between the target vehicle and the lead vehicular network, average network load conditions, average network exhaust temperature etc. The navigation preview may be based on information from a vehicle navigation system including a global positioning system and may include location information, destination information and route information.

At time t0, vehicle operation may be started (e.g., by activating an ignition key) and the vehicle may be operating in cold start conditions (e.g., temperature of an exhaust catalyst may be less than a catalyst light-off temperature). Further, the vehicle speed (plot 506) may be below threshold speed 507 (for example, the vehicle speed may be zero at t0), and the soot load (plot 501) may be less than threshold load 503. Consequently, DPF may not be regenerated.

At times between t0 and t1, vehicle speed may increase but may remain below the threshold and the vehicle may continue to operate in cold start conditions. Further, the soot load may increase and at time just before t1 the soot load may reach the threshold.

At time t1, the soot load may be greater than the threshold load. Further, the vehicle speed may be below the threshold and the vehicle may continue to operate in cold start conditions. Due to the soot load being greater than threshold, the vehicle controller may utilize an RFP optimizer function to determine if DPF regeneration may be performed. The RFP optimizer function may output the cost of regeneration (plot 504) at current operating conditions. Further, a cost of filling the DPF (plot 502) at current engine operating conditions may be determined. The cost of regeneration may be higher than the cost of filling due to vehicle operating in cold start conditions, and vehicle speed below the threshold. Consequently, DPF may not be regenerated.

At times between t1 and t2, the vehicle may continue to operate, and the vehicle speed may increase above the threshold speed. As the drive time increases, the vehicle may be warmed up with exhaust catalyst temperature increasing above the light-off temperature. Soot load may continue to increase above the first threshold load. Further, as the vehicle drive time increases, the cost of regenerating the DPF may decrease. However, the cost of regenerating the DPF may be greater than the cost of filling. Consequently, the DPF may not be regenerated.

At time just after t2, the cost of regeneration may decrease below the cost of filling. Consequently, regeneration of DPF may be started. DPF may be regenerated by a regenerative control strategy. The regenerative control strategy may include establishing a temperature set-point of the exhaust upstream of the DPF, and adjusting operating conditions to increase exhaust temperature to the set-point. In particular, a temperature set-point may be established for a location upstream of a DPF and downstream of a DOC. It will be appreciated that implementing a regenerative control strategy may further include delivering a post fuel injection to the combustion chamber based on steady state conditions. Furthermore, it will be appreciated that the exhaust gas air-fuel ratio may be lean during DPF regeneration to promote removal of the particulate matter in the DPF.

Further, a degree of regeneration may be determined based on one or more of current soot load conditions, a predicted drive time with favorable regeneration conditions based on information from the vehicle network and the vehicle navigation system, a vehicle speed, and an average speed of the vehicles in a lead vehicle network, wherein the network is linked to the vehicle via a vehicle-to-vehicle network system. For example, as the predicted drive time increases, the degree of regeneration may increase. In one example, the degree of regeneration may be the duration of time the DPF filter may regenerate. In another example, the degree of regeneration may be the amount of soot that may be regenerated based on estimated vehicle and network operating conditions which may include the predicted drive time, predicted load requirements, and a predicted thermal state of the vehicle.

In some examples, the decision to start regeneration may be based on a difference between the cost of filling and the cost of regeneration greater than a threshold difference. In some other examples, the decision to start regeneration may be based on an estimated ability to maintain the cost of regeneration below the cost of filling for a duration greater than a threshold duration. In still further examples, the decision to start regeneration may be based on an estimated ability maintain vehicle speed above the threshold speed for a duration greater than the threshold duration, wherein the estimation is based on the vehicle speed, and the average vehicle network speed of other vehicles within the vehicle-to-vehicle network. In yet another example, the decision to start regeneration may be based on the RFF. For example, the regeneration may commence in response to the RFF increasing above a threshold commencing probability.

At times between t2 and t3, the soot load may decrease (in response to regeneration) but may remain above the first threshold. As the soot is burned, the cost of filling may decrease. However, the cost of regeneration may be lower than the cost of filling. As a result, the DPF regeneration may continue.

At time t3, the cost of regeneration may be equal to the cost of filling. Subsequently, at times beyond t3, the cost of regeneration may increase and the cost of filling may decrease below the cost of regeneration. Consequently, the DPF regeneration may be terminated. The cost of regeneration may increase beyond t3 because, for example, the soot load has been reduced during the preceding regeneration event. The fuel required to regenerate a DPF with few particles is greater than that of a highly loaded DPF because the combustion of accumulated particulates provides some of the heat required to regenerate the DPF. In one example, the cost of regeneration may also increase in response to vehicle network information. If the traffic preview indicates highly unfavorable conditions ahead, the cost of continued regeneration may rise above the cost of filling. For example, the information from the vehicle network and the navigation system may indicate slowing down of the lead vehicle network. Consequently, the cost of regeneration may increase. In another example, the vehicle may be approaching its target destination. Therefore, the cost of regeneration may increase. In still another example, the vehicle may deviate from its current navigation path indicating a detour, and hence increasing the probability of an imminent stop condition. Consequently, the cost of regeneration may increase. In this way, a strategy based on cost of regenerating based on traffic and navigation preview versus cost of filling may be utilized to determine DPF regeneration conditions, and initiation and termination parameters.

FIG. 6 shows regeneration impact during various vehicle operation conditions, traffic conditions, and location information. In other words, a degree of regeneration that may be performed during opportunistic DPF regeneration during various vehicle operating conditions is shown. Specifically, table 600 shows different degrees of regeneration (partial, full unhindered, etc.) that may be utilized based on a vehicle speed of a target vehicle including a DPF ($V_{TV}$), average speed of vehicles in a lead vehicle network ($V_{LVN}$), and location information. In addition to vehicle, traffic, and location conditions, the degree of regeneration may be based on current soot load, and the RFF, wherein the RFF may be determined based on a remaining distance from a current location to the final destination or a potential final destination (e.g., as the distance decreases, RFF may decrease since the regeneration may not be completed before reaching the destination, thereby contributing to an increase in a probability of forced termination); the probability of detours given past driving history and a current GPS route information; a probability of unhindered regeneration based on the current traffic information of a lead vehicle network (LVN) of vehicles travelling ahead of the vehicle within a threshold distance, and the remaining distance from the destination; engine load requirements (for example, increasing grade requires higher engine load and may result in hotter exhaust which may increase RFF); and a current thermal state of the vehicle (for example, higher exhaust temperature conditions may increase RFF).

During a first condition when the target vehicle speed is greater than a threshold vehicle ($V_{TV}>V_{LL}$) speed, and the average lead network speed is greater than or equal to the target vehicle speed ($V_{LVN} \geq V_{TV}$), the target vehicle may move unhindered for a duration greater than a threshold duration. Consequently, full unhindered regeneration may be carried out.

During a second condition when the target vehicle speed is greater than or equal to the average lead vehicle network speed ($V_{TV} \geq V_{LVN}$), and the average lead vehicle network speed is less than the threshold speed ($V_{LVN}<V_{LL}$), the target vehicle may merge with the lead vehicle network. The lead vehicle network may include stopped traffic. Therefore, only partial regenerations may be possible.

During a third condition when the final destination is known, regeneration may be based on the route knowledge and regeneration parameters (e.g., soot load, RFF, cost of filling, cost of regenerating, etc.). Details of determining RFF, cost of filling and cost of regenerating are discussed with respect to FIG. 3. The regeneration may be a full regeneration, partial regeneration or the regeneration may not be initiated.

During a fourth condition, when the target vehicle takes a detour from a highway, social media and global positioning system parameters may be utilized to determine potential vehicle stop conditions. In response to detecting a detour, the target vehicle may prepare for DPF regeneration termination. As a result, DPF regeneration termination may be managed more efficiently.

In one example, a method may comprise selectively regenerating a diesel particulate filter based on a soot load, a predicted destination distance, and an estimated ability to maintain a vehicle speed greater than a threshold speed for a duration greater than a threshold duration, the particulate filter receiving exhaust from an engine combusting diesel fuel. The method may further include wherein the estimation is based on the vehicle speed, and an average speed of other vehicles within a vehicle to vehicle network; wherein the soot load is greater than a first threshold soot load, the predicted destination distance is greater than a first threshold distance, and the vehicle speed is less than the average speed of the vehicle network; and wherein the vehicle network includes one or more vehicles travelling ahead of the vehicle and within a threshold distance from the vehicle. The method may further comprise regenerating the particulate filter based on soot load only in response to the soot load greater than a second threshold load, the second threshold load greater than the first threshold load; performing a complete regeneration of the particulate filter in response to the vehicle speed greater than the threshold speed, and the vehicle speed less than the average speed of the vehicle network; performing a partial regeneration of the particulate filter in response to the vehicle speed greater than the average speed of the vehicle network, and the average speed of the vehicle network is less than the threshold vehicle speed; and preparing to terminate the regeneration in response to one or more of detecting a vehicle detour from a predicted path, the predicted destination distance less than a second threshold distance, and the vehicle speed less than the threshold speed, and wherein the second threshold distance is less than the first threshold distance.

Further, the method may comprise determining a first cost of filling the particulate filter, determining a second cost of regenerating the particulate filter, and in response to the second cost of regenerating less than the first cost of filing, commencing the regeneration of the particulate filter; wherein the first cost of filling is based on a probability of forced regeneration, a probability of partial regeneration, and an estimated impact of filling the filter on an efficiency of the engine; and wherein the second cost of regenerating is based on a first fuel cost to attain a diesel oxidation catalyst light off temperature, and a second fuel cost to achieve a desired regeneration amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
selectively regenerating a diesel particulate filter based on a soot load, a predicted destination distance, and an estimated ability to maintain a vehicle speed greater than a threshold vehicle speed, the particulate filter receiving exhaust from a vehicle engine combusting diesel fuel;
wherein the estimated ability to maintain the vehicle speed greater than the threshold vehicle speed is based on the vehicle speed and an average speed of other vehicles within a lead vehicle to vehicle network communicatively coupled to the vehicle.

2. The method of claim 1, wherein the estimated ability is maintained for a duration greater than a threshold duration; and wherein the lead vehicle to vehicle network includes one or more vehicles travelling ahead of the vehicle within a threshold distance.

3. A method for a vehicle, comprising:
selectively regenerating a diesel particulate filter based on a soot load, a predicted destination distance, and an estimated ability of the vehicle to maintain a vehicle speed greater than a threshold vehicle speed, the particulate filter receiving exhaust from a vehicle engine combusting diesel fuel, wherein the estimated ability is maintained for a duration greater than a threshold duration; and wherein the soot load is greater than a first threshold soot load, the predicted destination distance is greater than a first threshold distance, and the vehicle speed is less than an average speed of other vehicles in a vehicle to vehicle network communicating with the vehicle.

4. The method of claim 3, wherein the vehicle to vehicle network includes one or more vehicles travelling ahead of the vehicle and within a threshold distance from the vehicle.

5. The method of claim 3, further comprising regenerating the particulate filter based on soot load only in response to the soot load greater than a second threshold load, the second threshold load greater than the first threshold load.

6. The method of claim 4, further comprising performing a complete regeneration of the particulate filter in response to the vehicle speed greater than the threshold vehicle speed, and the vehicle speed less than the average speed of the vehicle to vehicle network.

7. The method of claim 4, further comprising performing a partial regeneration of the particulate filter in response to the vehicle speed greater than the average speed of the vehicle to vehicle network, and the average speed of the vehicle to vehicle network less than the threshold vehicle speed.

8. The method of claim 4, further comprising preparing to terminate the regeneration in response to one or more of detecting a vehicle detour from a predicted path, the predicted destination distance less than a second threshold distance, and the vehicle speed less than the threshold vehicle speed, and wherein the second threshold distance is less than the first threshold distance.

9. The method of claim 3, further comprising determining a first cost of filling the particulate filter, determining a second cost of regenerating the particulate filter, and in response to the second cost of regenerating less than the first cost of filling, commencing the regeneration of the particulate filter.

10. The method of claim 9, wherein the first cost of filling is based on a probability of forced regeneration, a probability of partial regeneration, and an estimated impact of filling the particulate filter on an efficiency of the engine.

11. The method of claim 10, wherein the second cost of regenerating is based on a first fuel cost to attain a diesel oxidation catalyst light off temperature, and a second fuel cost to achieve a desired regeneration amount.

12. A method for a vehicle comprising:
during a first condition, performing regeneration of a particulate filter based on an amount of soot accumulated in the particulate filter and a cost based opportunistic regeneration condition; and
during a second condition, performing regeneration based on the amount of soot accumulated and not based on the cost based opportunistic regeneration condition;
wherein, the cost based opportunistic regeneration condition is determined based on one or more of a traffic information of a vehicular network including the vehicle, a lead vehicle network including one or more other vehicles travelling ahead of the vehicle within a threshold distance, a destination information of a destination of the vehicle, and a vehicle speed relative to an average vehicle speed of the lead vehicle network;
wherein performing regeneration during the first condition includes performing complete regeneration in response to the vehicle speed less than the average vehicle speed; and
wherein performing regeneration during the first condition includes performing partial regeneration in response to the vehicle speed greater than the average vehicle speed.

13. The method of claim 12, wherein the first condition includes the amount of soot greater than a first threshold amount and less than a second threshold amount; and wherein the second threshold amount is greater than the first threshold amount.

14. The method of claim 13, wherein the second condition includes the amount of soot greater than the second threshold amount.

15. The method of claim 14, wherein determination of the cost based opportunistic regeneration condition includes determining a first cost of filling the particulate filter, and a second cost of regenerating the particulate filter; wherein the first cost of filling is based on a probability of forced regeneration, a probability of partial regeneration, and an estimated impact of filling the particulate filter on an efficiency of an engine in the vehicle; and wherein the second cost of regeneration is based on a first fuel cost to attain a diesel oxidation catalyst light off temperature and a second fuel cost to achieve a desired regeneration amount.

16. The method of claim 15, further comprising starting regeneration of the particulate filter in response to the second cost of regenerating decreasing below the first cost of filling.

17. The method of claim 16, further comprising stopping regeneration of the particulate filter in response to the second cost of regenerating increasing above the first cost of filling, or in response to an estimated duration of the second cost of regenerating remaining below the first cost of filling less than a threshold duration.

18. The method of claim 14, wherein determination of the cost based opportunistic regeneration condition includes determining a conditional probability of achieving a desired amount of regeneration based on a distance remaining to reach a final destination, the average vehicle network speed of the lead vehicle network, an average network load of the lead vehicle network, and a probability of detour; and further comprising regenerating the particulate filter in response to the conditional probability increasing above a preselected probability.

19. A system for a vehicle, comprising:
an engine having an exhaust pipe;
a particulate filter coupled in the exhaust pipe downstream of an emission control device;
a communication module for communicatively coupling the vehicle to an off-board cloud network and for communicatively coupling the vehicle to a navigation system; and
a computer readable storage medium having instructions encoded thereon for controlling regeneration of the particulate filter, including:
instructions to initiate particulate filter regeneration in response to an amount of stored particulate and an estimated ability to maintain a cost of regeneration lower than a cost of filling the particulate filter for a duration greater than a threshold duration; and
instructions to terminate the particulate filter regeneration in response to one or more of the amount of stored particulate falling below a threshold percentage of stored particulate, and the cost of regeneration increasing above the cost of filling; wherein, the threshold percentage of stored particulate is based on a particulate burning rate;

wherein the cost of regeneration is based on an average speed of a lead vehicle network relative to a vehicle speed, the lead vehicle network including one or more other vehicles travelling ahead of the vehicle; and wherein the cost of regeneration increases as the average speed decreases relative to the vehicle speed.

20. The system of claim 19, wherein the instructions include determining the cost of regeneration based on a predicted behavior of a vehicle operator, the predicted behavior determined based on a current vehicle speed, the average speed of the lead vehicle network including one or more vehicles travelling ahead of the vehicle and communicating with the cloud network, a current location of the vehicle, a destination of the vehicle, and a travel history.

* * * * *